Figure 1:
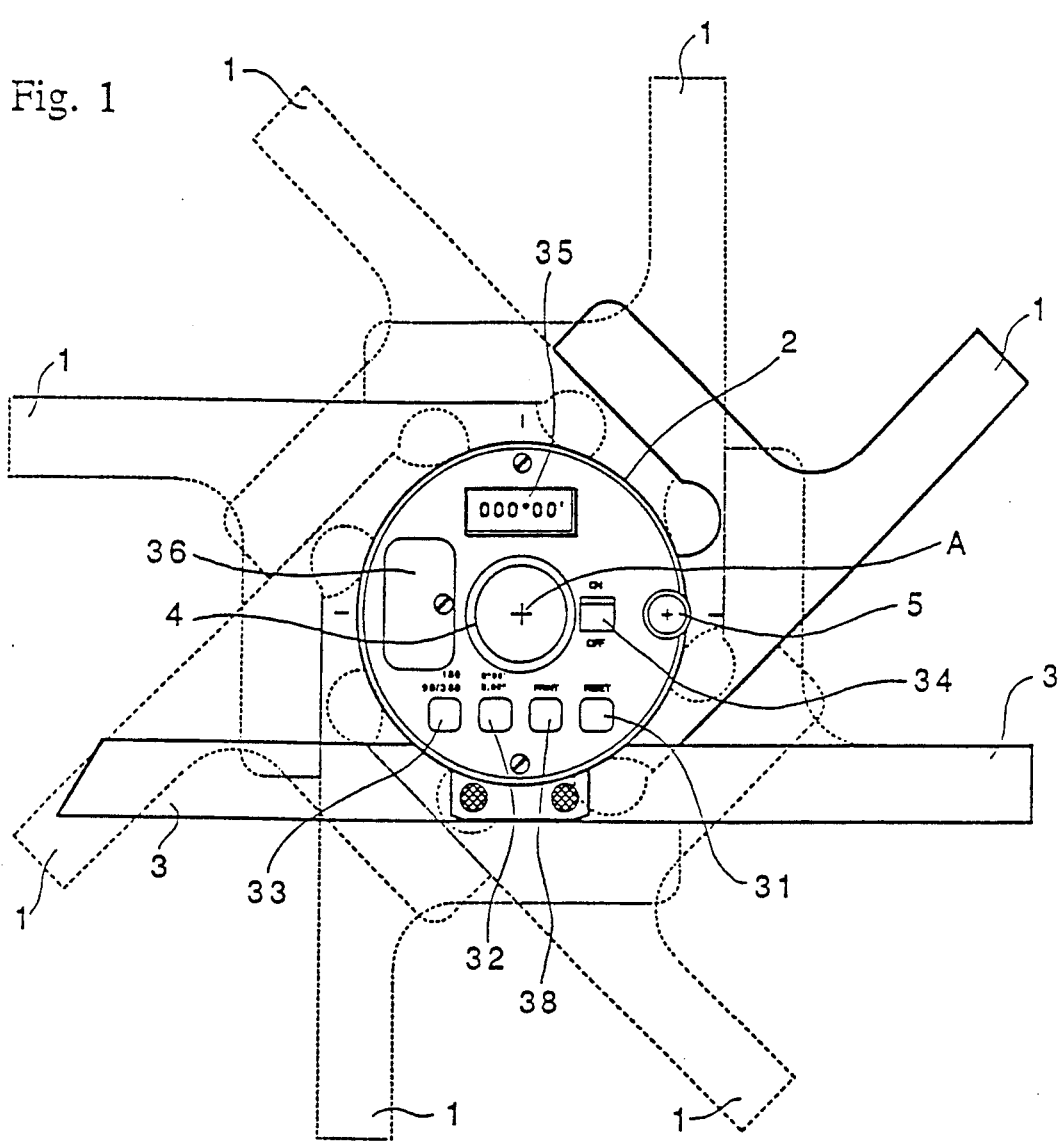

United States Patent [19]

Weber

[11] Patent Number: 5,040,298
[45] Date of Patent: Aug. 20, 1991

[54] PROTRACTOR WITH ELECTRONIC MEASURING DEVICE AND DIGITAL DISPLAY

[76] Inventor: Hans R. Weber, 10, Chemin du Grillon, Lausanne CH-1007, Switzerland

[21] Appl. No.: 372,375
[22] PCT Filed: Oct. 13, 1988
[86] PCT No.: PCT/CH88/00189
   § 371 Date: Aug. 3, 1989
   § 102(e) Date: Aug. 3, 1989
[87] PCT Pub. No.: WO89/03503
   PCT Pub. Date: Apr. 20, 1989

[30] Foreign Application Priority Data
   Oct. 13, 1987 [CH] Switzerland ............ 4057/87
   Mar. 29, 1988 [CH] Switzerland ............ 1183/88

[51] Int. Cl.⁵ .................. G01B 3/56; G01B 5/24; G01B 7/30
[52] U.S. Cl. .................. 33/1 N; 250/231.14; 33/424; 33/1 PT
[58] Field of Search .......... 33/1 N, 424, 1 PT; 250/231.13, 231.14; 364/559

[56] References Cited

U.S. PATENT DOCUMENTS

| | | | |
|---|---|---|---|
| 4,358,898 | 11/1982 | Johnson | 33/1 N |
| 4,442,606 | 4/1984 | Graham et al. | 33/1 N |
| 4,492,031 | 1/1985 | Koenuma | 33/1 N |
| 4,513,512 | 4/1985 | Fischer | 33/1 N |

FOREIGN PATENT DOCUMENTS

| | | | |
|---|---|---|---|
| 3217424 | 11/1983 | Fed. Rep. of Germany | 33/1 N |
| 0153263 | 9/1982 | Japan | 33/1 N |
| 0158292 | 10/1978 | Netherlands | 33/1 N |

Primary Examiner—William A. Cuchlinski, Jr.
Assistant Examiner—William C. Dowling
Attorney, Agent, or Firm—Sherman and Shalloway

[57] ABSTRACT

In order to provide an protractor with an electronic, digital display instead of a vernier angle scale, each section (6 and 10, and 8) of the capacitive element of a measuring device is connected to one of the arms (1, 3). Since the parts of this capacitive element must not be pressed against one another by the pressing together of the arms (1, 3) of the protractor, a clamping element (20) is required which can form a mechanical connection between the two arms (1, 3) through central bores (6a, 10a, 21a-c) in these parts when said arms (1, 3) are locked together in such a way that they cannot rotate relative to one another, by means of tightening a locking nut (4) on a central shaft (12). In this way, it is possible to ensure that the screen (8) between the electrode discs (6, 10), which are located at a predetermined relative spacing, is prevented together with the fixed arm (1) from moving while the electrode discs (6, 10) rotate in conjunction with the rotating arm (3) about the rotational axis (A) of the protractor. A logic electronics system and a digital display allow the angle set between the arms to be read digitally.

5 Claims, 5 Drawing Sheets

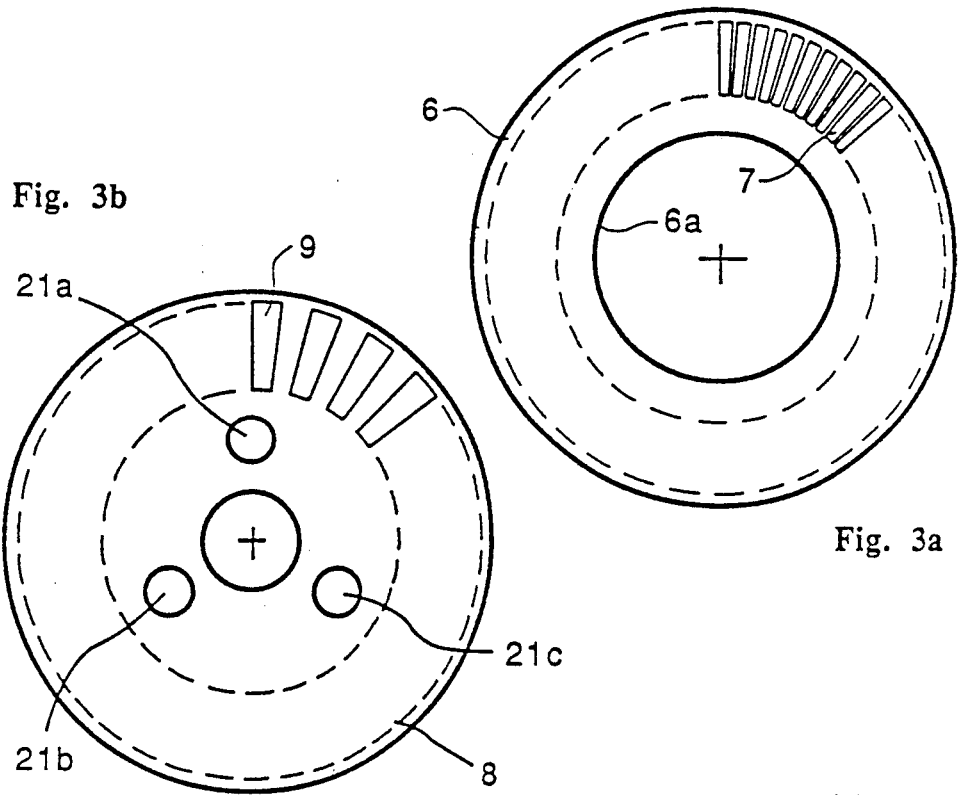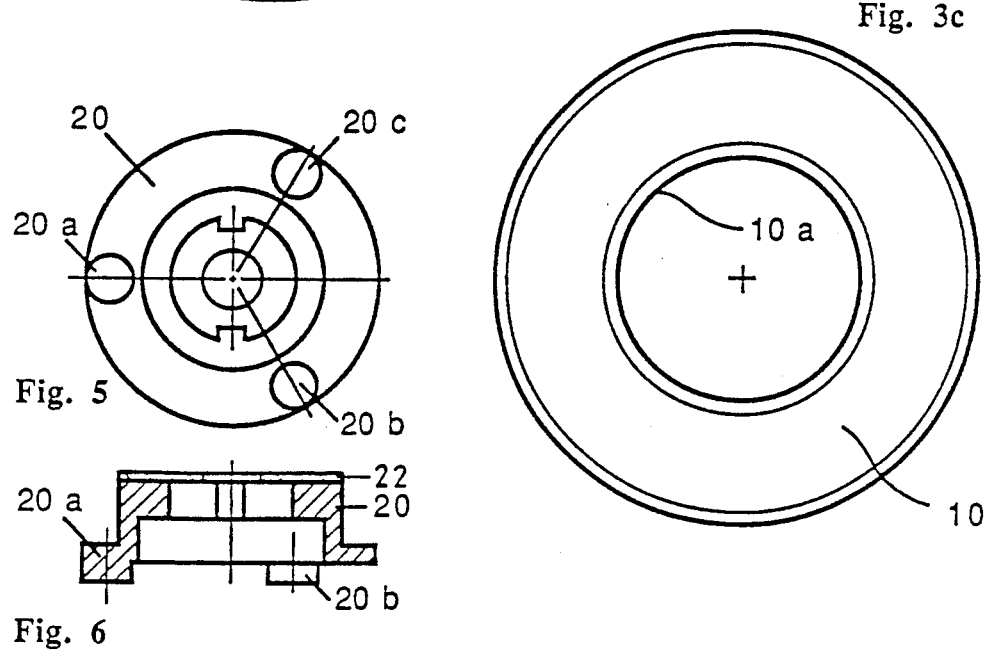

PROTRACTOR WITH ELECTRONIC MEASURING DEVICE AND DIGITAL DISPLAY

The present invention relates to a protractor in accordance with the preamble of claim 1.

Mechanical protractors or angular measuring systems with two arms pivoting relative to one another about a central shaft and with an angular reading in the form of a vernier scale for the purpose of determining the angle set between the two arms have been known in the art for a long time. They generally possess, at least in the case of precision instruments, a vernier angle scale with the aid of which the angle formed between the two arms can be read off to an accuracy of within one tenth of a degree or to one minute precisely. Since reading off such scales with their multiplicity of relatively closely adjacent graduations is not universally popular, wrong measurements or misreadings are a frequent occurrence.

The objective of the present invention, therefore, is to propose a protractor which, on the one hand, excludes the danger of misreadings, and digitally displays the angle set between the two arms, and which, on the other hand, makes use of currently available electronic means of resetting and reading transformation.

This is achieved in the invention by means of an protractor as described hereinafter.

With the aid of the enclosed drawing, an advantageous embodiment of an protractor in accordance with the invention is described below, and the design problems which had to be solved are explained.

Figure 2:
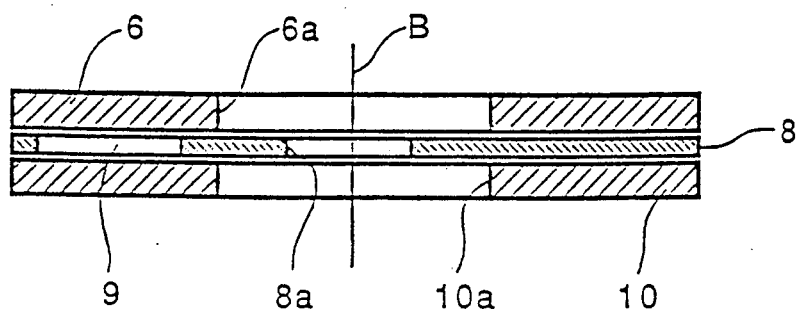
Figure 4A:
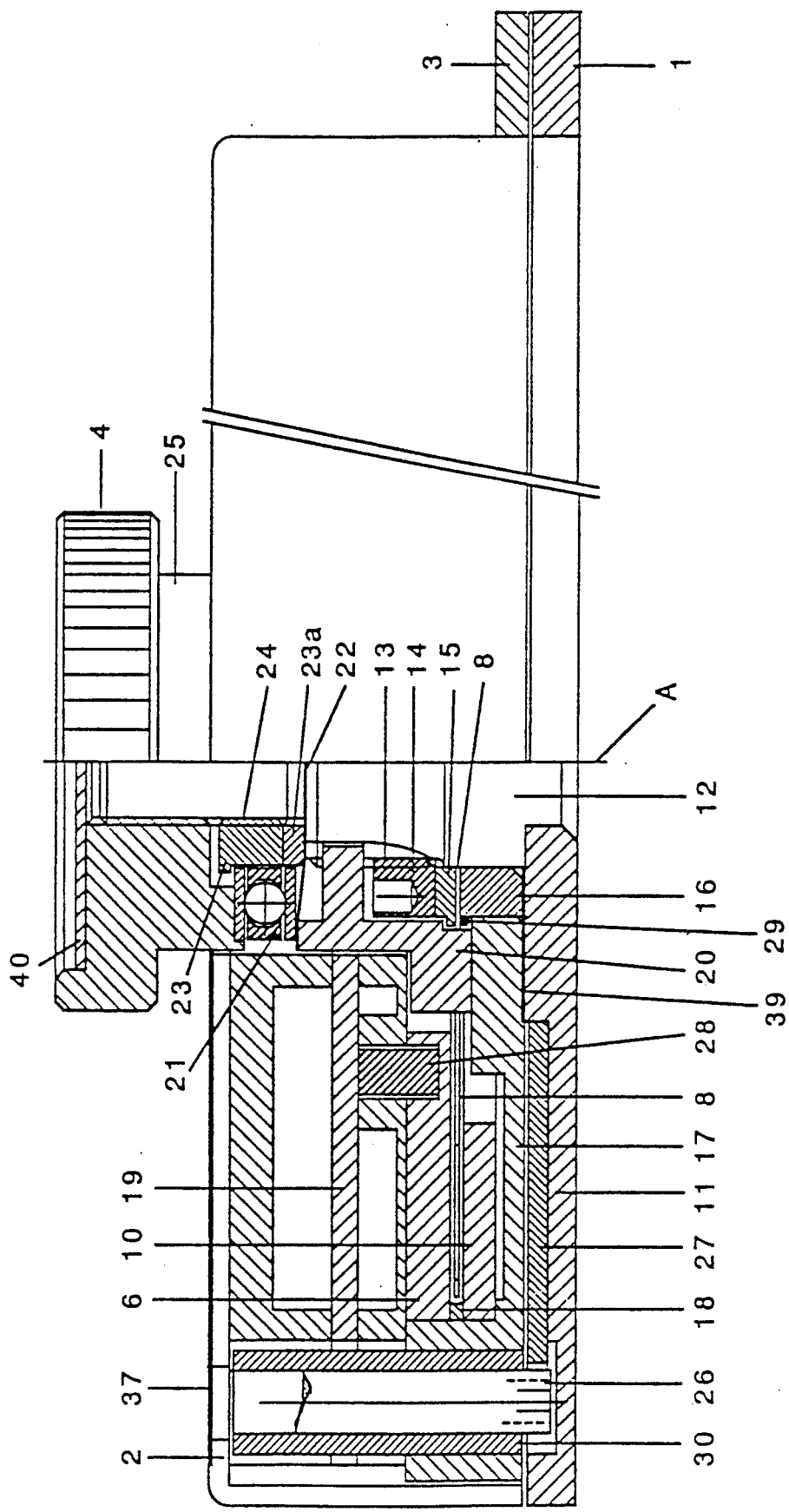
Figure 4B:
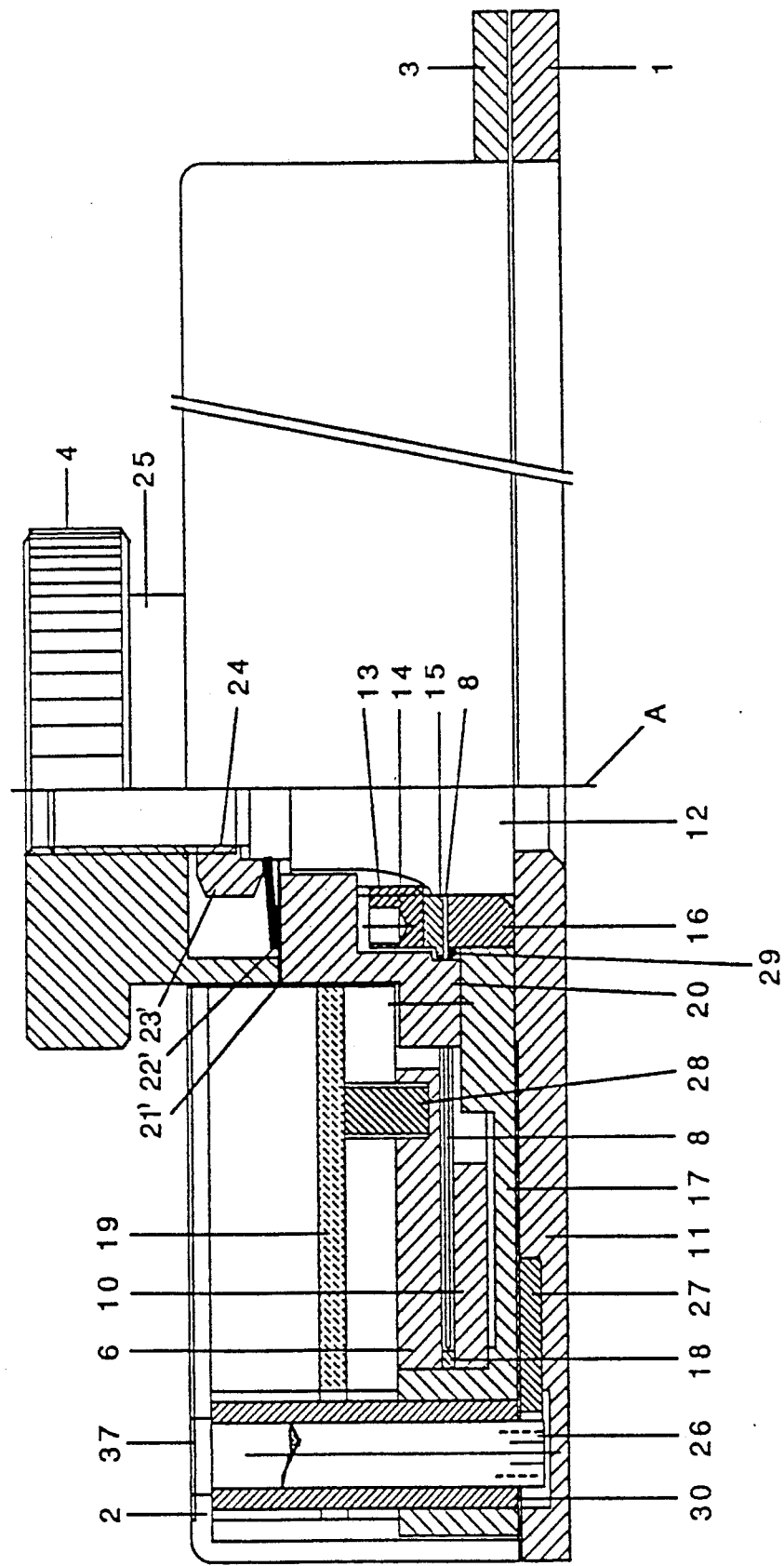
Figure 7:
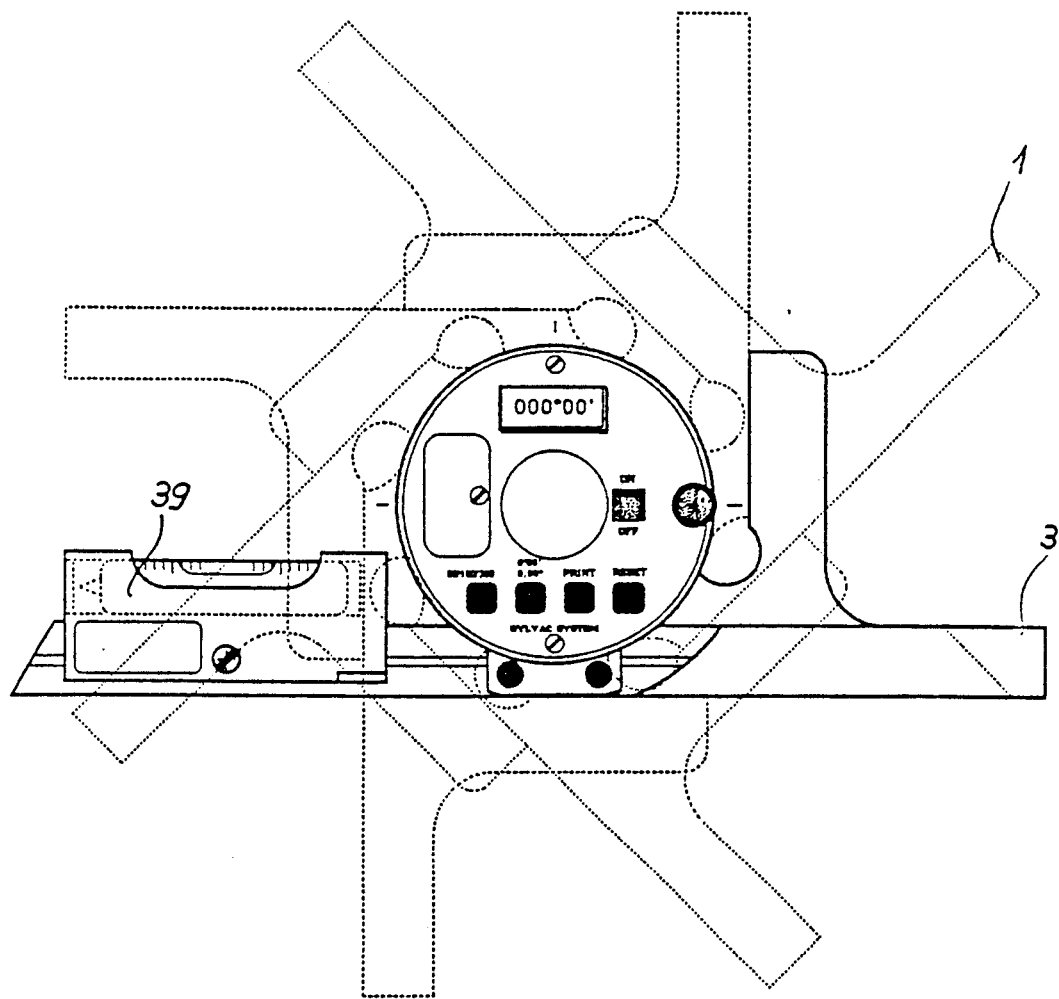

The drawings are as follows:

FIG. 1 shows a plan of such a protractor in which the fixed arm is represented by broken lines in the eight 45° segments of a circle relative to the rotating arm, FIG. 2 shows a cross-section through an electromechanical measuring device which should be located such that it can rotate about the rotational axis of the protractor and should be protected against mechanical influences, FIGS. 3a, 3b and 3c show the three main components of the measuring device according to FIG. 2, each in a plan view, FIG. 4a shows a partial section through the protractor with a first embodiment of a central mounting arrangement, FIG. 4b shows a partial section through the protractor with a second embodiment of a central mounting arrangement, FIG. 5 shows a plan view of a central clamping element in the protractor, which is intended to ensure that the unit is locked and unable to rotate, without affecting the electromechanical measuring device, FIG. 6 shows the clamping element as in FIG. 5 in cross-section, and FIG. 7 shows a protractor in accordance with the invention for a special application.

In FIG. 1 it can be seen that the protractor in accordance with the invention largely corresponds to a conventional mechanical universal bevel protractor as far as its primary mechanical components are concerned, i.e. a fixed arm 1 which is either firmly attached or firmly attachable to the base 11 (FIG. 4) of the protractor, a movable arm 3 which is capable of rotating, as far as possible without play, about a rotational axis A, which arm is firmly attached to the cover 2 of the protractor, and a central locking nut 4. It is also advantageous for it to have, as shown here, a device operated by a control knob 5 and described in further detail below for setting small angular changes precisely. It is further recommended that the protractor in accordance with the invention be provided with the necessary means to permit precise setting of the calibration mark where the movable arm 3 is exactly flush with the fixed arm 1. The means required to this end and the possible means for attaching the movable arm 3 to the rotating part 17 are not, however, integral to the present invention and are therefore not described further.

FIG. 2 illustrates the approximate construction of a capacitive measuring device as advantageously used in the protractor according to the invention. In addition to an electronic system, which is not further described here, it consists, in the case of a 3-disc model, essentially of a disc-shaped first electrode disc 6 with patterned electrode areas (FIG. 3a), an electrostatic shield 8 with apertures 9 and a second homogeneous electrode disc 10. Each of these three disc-shaped capacitor elements 6, 8 and 10 has a central bore 6a, 8a and 10a, respectively, whose function is described in more detail below. When the electrode disc 6 with the patterned electrode areas 7 is rotated about the central axis A of the measuring device relative to the shield 8, capacitive variations are produced, as is already known in the art, from which the precise angular position of the rotated element relative to the fixed element of the capacitor with reference to a defined initial location can be calculated. The relevant technology is known in the art and is therefore not described further here.

Alternatively, instead of a 3-disc measuring device, one with only two discs can be used, in which the shield is replaced by a passive electrostatic reflector and the homogeneous electrode disc is omitted or included in the form of a single component together with the patterned electrode area disc.

There is a tried and tested method with which persons skilled in the art of conventional protractors are familiar, whereby the rotating arm 3 connected to the cover 2 is fixed in its position relative to the fixed arm 1 by rotating the central locking nut 4 immediately after it has been moved into the desired position relative to the fixed arm 1, which is attached to the base 11 and a central shaft 12 (FIGS. 4a and 4b). A capacitive measuring device, as described with the aid of FIGS. 2 and 3a to 3c, whose electrode discs 6 and 10 and shield 8 must not move axially relative to each other, since the air gap between these elements is of great importance for the capacitance of the measuring device in every angular position, must not, however be affected when the central elements of the protractor, and thus the arms 1 and 3, are pressed together by the locking nut. A proposal is therefore required in the present invention relating to a design which, on the one hand, makes no changes to the existing system for operating a protractor by persons skilled in the art and, on the other, takes account of the particular requirements of the electromechanical elements of the capacitive measuring device necessary for the digital display of the angles.

Persons skilled in the art will recognise from FIG. 4a how this design problem can be solved by the invention. A central shaft 12 is firmly attached to the base 11, for example by means of riveting. At the same time, the fixed arm 1 of the protractor is firmly attached or at least firmly attachable to this base 11. It is advantageous for the shaft to have two different threaded sections, of which the lower threaded section 13 with a first nut 14 serves the purpose of connecting an electrostatic shield 8 firmly with the base 11 and preventing rotation by means of an intermediate ring 15 and a concentric ring 16 in that the shield 8 is clamped between the intermediate ring 15 and the concentric ring 16, and these three components are pressed on to the base 11. In this way, the shield 8, with reference to the rotational axis A of the protractor, is in a fixed angular position relative to the fixed arm 1. It is also firmly positioned with reference to its distance from the base 11. A tray 17, rotating without play about the rotational axis A, is mounted on the concentric ring 16, into which tray 17 the two electrode discs 6 and 10, advantageously held at a given distance to each other by means of a spacer 18, are inserted in such a way that they cannot rotate. The cover 2 and a logic electronics system 19 for evaluating the capacitance and capacitance variations of the measuring device (6, 8, 10) when the protractor is in use are also connected to the tray 17 in such a way that they cannot rotate, together with the display and operating elements (35; 31-34) as shown in FIG. 1. If the rotating arm 3 is rotated about the axis A relative to the fixed arm 1, the tray 17 and the cover 2, together with all the components connected with them, rotate relative to the base 11 and all the components connected to it. This means that, when the rotating arm 3 is rotated relative to the fixed arm 1, the two electrode discs 6 and 10 rotate about the axis A relative to the fixed shield 8, which, as is known in the art, results in capacitance variations in the measuring device which can be converted electronically into a digital readout of the angle.

To enable the tray 17 to be pressed against the base by turning a locking nut 4 in such a way that it cannot rotate, a clamping element 20 is required, an example of which is illustrated in detail in FIGS. 5 and 6. As can be seen from FIG. 4 the three lugs 20a, 20b and 20c of this clamping element 20 engage the three holes 21a, 21b and 21c (FIG. 3b) provided for this purpose in the shield 8, with the result that the clamping element is supported on the central part of the tray 17. Since the shield 8 is connected to the shaft 12 in such a way that it cannot rotate, the clamping element 20 must not be able to rotate relative to the shaft 12 either. In order also to position it in its axial location relative to the base 11, it is advantageous for it to have a membrane 22 at its upper end, which is contacted by an axial ball bearing 21. A second nut 23, which is screwed on to the upper threaded section 24 of the shaft 12 contacts a central locking ring 23a in such a way that this ring presses the membrane 22 down firmly in the centre on to a subjacent shoulder of the shaft 12 and protects it against any possibility of rotating. In this way, the clamping element 20 is firmly connected to the shaft 12 in such a way that it cannot rotate although, thanks to the membrane 22, which is advantageously made of a resilient material, it retains a limited degree of mobility axially. As a result, the rotating arm 3 remains free of play relative to the fixed arm 1, but not rotatable without a minimum of externally applied torque, by means of which arms 1 and 3 can be positioned smoothly, without being unintentionally displaced relative to each other. In order to fix the position of the tray 17 relative to the base 11, and therefore the rotating arm 3 relative to the fixed arm 1 once the desired angle has been set and to avoid any axial movement of the clamping element 20, it is sufficient to tighten the locking nut 4, the result of which is that a coupling ring 25, which is advantageously connected to it in one piece, presses the tray 17 against the base 11 non-positively via the ball bearing 21 and the clamping element 20 until the fixed arm 1, which is connected to the base 11, and the movable arm 3, which is connected or capable of connection to the tray 17, are locked relative to each other in such a way that they cannot rotate. In order to keep the required locking force to a minimum, it is recommended that a friction disc 39 be inserted in the central part of the protractor between the base 11 and the tray 17. As is known in the art, a removable cover 40 can be inserted into the locking nut 4.

In a design variation of the central element, the clamping element 20 can, as illustrated in FIG. 4b, be contacted at its upper end by a washer 21' and a spring washer 22' acting on the second nut 23', which is screwed on to the upper threaded section of the shaft 12, in order to position it in its axial location relative to the base 11. The tray 17 clamped between the base 11 and the clamping element 20 remains more or less freely rotating, depending on the extent to which the second nut 23' is tightened. With this embodiment, too, care should ideally be taken to ensure that the tray 17 remains free of play relative to the base 11, and thus the movable arm 3 relative to the fixed arm 1, but not rotatable without a minimum of externally applied torque, such that arms 1 and 3 can be positioned smoothly without being unintentionally displaced relative to one another. In order to fix the position of the tray 17 relative to the base 11, and therefore the rotating arm 3 relative to the fixed arm 1, once the desired angle has been set, it is sufficient with this embodiment, too, to tighten the locking nut 4, the result of which is that a coupling ring 25, which is advantageously connected to it in one piece, presses the tray 17 additionally against the base 11 non-positively via the clamping element 20, until the fixed arm 1, which is connected to the base 11, and the movable arm 3, which is connected or capable of connection to the tray 17, are locked relative to one another in such a way that they cannot rotate.

Thanks to the design of the protractor according to the present invention and particularly to its central element where the various rotating components are mounted, it is possible to retain the operation of universal bevel protractors with vernier scales, which has been customary hitherto, without the axial mounting of the individual mechanical components, which occurs in the centre, affecting the capacitive measuring device, even though they pass through it.

The central bores 6a and 10a (FIGS. 3a and 3c) of the two electrode discs 6 and 10 are designed to be larger than the outer diameter of the components which pass through them and clamp the shield 8 and the tray 17. This guarantees that no axial displacement of the relative positions of the tray 17 and the clamping element 20 can occur, with the result that the position of the three components of the measuring device—the two electrode discs 6 and 10 and the shield 8—always remains unchanged with regard to the spacing between them. It is for this reason alone that the clamping of the rotating arm 3 to the fixed arm 1 does not affect the angular reading which is determined electromechanically and converted electronically into a digital readout. When a two-disc measuring device is used, in which the second electrode disc 10 is omitted, the height of the protractor can be reduced. With such an embodiment, as mentioned above, the shield 8 is also replaced by a passive electrostatic reflector.

In order to be able to adjust the protractor according to the invention finely and with maximum precision, it is advantageous to provide it with a fine adjustment system, consisting as is known of a control knob 5 (FIG. 1) which causes a pinion 26, and thus the cover 2 with the rotating arm 3 and the tray 17, to rotate like a satellite about a cog 27, fastened to the base 11, and thus about the fixed arm 1.

An elastomer 28 with conducting strips can be used to provide the electrical connection between the logic electronics system 19 and the electrode disc 6 bearing the patterned electrode areas 7 (FIG. 3a). It is also advantageous to provide a contact ring 29 to secure the opposite pole in the shield 8. It is also advisable to mount the pinion 26 in a bearing bush 30 to ensure that it tracks precisely and does not unintentionally contact the cover 2 or the logic electronics 19.

Persons skilled in the art will recognise that the present invention in conjunction with known technical designs of conventional protractors permits a new protractor to be constructed which, in its practical operation, corresponds to the former types but displays the set angle digitally. By using an appropriate, known logic electronics system 19, it is also possible to define any initial position of the two arms 1 and 3 as the calibration mark from which an angle can be measured. This is possible, as is known in the art, by means of a reset knob 31 (FIG. 1) which zeros the electronics system. Conversion of the display from degrees and minutes to a decimal degree readout is also feasible and can easily be achieved by pressing a button (button 32). Further electronic switching, e.g. a 90°/180°/360° switch by means of a further button 33, can also be provided. In addition, it is sensible to provide an on/off button 34, by means of which the logic electronics can be switched off. An LCD display is preferably used for the display 35. It is further recommended that an appropriate opening with cover 36 be provided to enable the battery/batteries required for the operation of the electronics system and display to be changed easily. In order to be able easily to adapt the necessary data for the various operational elements of the new protractors to the relevant conditions, which depend on the electronics system used, it is sensible to provide a front panel 37 in the cover 2. An output to permit the transfer of readings to a computer or printer by pressing an appropriate button 38 could also usefully be provided.

The protractor according to the invention can be provided with further mechanical and/or electronic auxiliary devices to meet the requirements of the user. Individual elements can also be designed differently from those in the advantageous embodiment described above with two design variations in the central section.

FIG. 7 illustrates a further advantageous embodiment of an protractor in accordance with the invention, in which a water or bubble level 39 is located on the rotating arm 3 in such a way that the protractor can be used to measure the inclination of a plane to the horizontal without a horizontal stop being necessary for the rotating arm.

I claim:
1. A protractor comprising:
   a base;
   a cover, said base and said cover being rotatable with respect to one another about a common rotational axis;
   a fixed arm attached to said base for rotation therewith about said common rotational axis;
   a rotating arm attached to said cover for rotation therewith about said common rotational axis;
   electronic measuring means, including a first part and a second part, for measuring the angle between said fixed arm and said rotating arm, said first part and said second part being rotatable with respect to one another about said common rotational axis;
   first mounting means for mounting said first part to said base for rotation therewith about said common rotational axis;
   second mounting means for mounting said second part to said cover for rotation therewith about said common rotational axis, said first mounting means and said second mounting means cooperating to maintain said first part and said second part axially spaced apart by a predetermined distance;
   digital display means, operably connected to said electronic measuring means, for displaying the measured angle between said fixed arm and said rotating arm;
   locking means, operably connected to said base and said cover, for selectively applying compressive pressure between said base and said cover to prevent rotation thereof with respect to one another about said common rotational axis;
   said locking means and said electronic measuring means cooperating with one another to allow selective application of said compressive pressure by said locking means without alteration of said predetermined axial spacing and angular relationship of said first part and said second part of said electronic measuring means and said angle between said fixed arm and said rotating arm.

2. The protractor according to claim 1, further comprising a central shaft fixedly attached to said base for rotation therewith, said central shaft being coaxial with said common rotational axis, said central shaft having a lower threaded section; and wherein said first part has an inner peripheral portion and said first mounting means comprises a concentric ring concentrically receivable on said central shaft and a first nut, threadingly engageable of said lower threaded section, said inner peripheral portion of said first part being champingly receivable between said concentric ring and said first nut; and wherein said second mounting means comprises a tray concentric with said central shaft and rotatable about said common rotational axis, said tray attached to said cover for rotation therewith, said tray slidingly contacting said base, said second part attached to said tray for rotation therewith.

3. The protractor according to claim 2, wherein said central shaft has an upper threaded section; and wherein said locking means comprises a clamping element contactable with said tray and lock nut means, threadingly engageable of said upper threaded section, for selectively applying compressive force to said clamping element to force said tray into non-sliding contact with said base to prevent rotation of said cover with respect to said base.

4. The protractor according to claim 3, further comprising biasing means for yieldably urging said clamping element into engagement with said tray with sufficient force to inhibit free rotation of said cover with respect to said base.

5. The protractor according to claim 1, further comprising a bubble level, connected to one of said fixed arm or said rotatable arm, for determining the horizontal.

* * * * *